United States Patent
Tobimatsu et al.

(10) Patent No.: US 10,661,484 B2
(45) Date of Patent: May 26, 2020

(54) MOLD FOR IN-MOLD FOAM-MOLDING OF POLYOLEFIN-BASED RESIN, METHOD FOR MANUFACTURING IN-MOLD FOAM-MOLDED ARTICLE, AND IN-MOLD FOAM-MOLDED ARTICLE

(71) Applicant: Kaneka Corporation, Osaka (JP)

(72) Inventors: Yuki Tobimatsu, Osaka (JP); Masahiko Sameshima, Osaka (JP)

(73) Assignee: KANEKA CORPORATION, Osaka (JP)

( * ) Notice: Subject to any disclaimer, the term of this patent is extended or adjusted under 35 U.S.C. 154(b) by 416 days.

(21) Appl. No.: 15/405,909

(22) Filed: Jan. 13, 2017

(65) Prior Publication Data

US 2017/0136659 A1     May 18, 2017

Related U.S. Application Data

(63) Continuation of application No. PCT/JP2015/068660, filed on Jun. 29, 2015.

(30) Foreign Application Priority Data

Jul. 15, 2014   (JP) ................................ 2014-145316

(51) Int. Cl.
*B29C 33/12* (2006.01)
*B29C 44/12* (2006.01)
(Continued)

(52) U.S. Cl.
CPC ............ *B29C 33/123* (2013.01); *B29C 33/12* (2013.01); *B29C 44/1214* (2013.01);
(Continued)

(58) Field of Classification Search
CPC ............ B29C 44/1214; B29C 44/1271; B29C 44/445; B29C 44/58; B29C 67/20; B29C 70/78
(Continued)

(56) References Cited

FOREIGN PATENT DOCUMENTS

| JP | H0857884 A | 3/1996 |
|---|---|---|
| JP | H08174564 A | 7/1996 |

(Continued)

OTHER PUBLICATIONS

International Search Report issued in corresponding International Application No. PCT/JP2015/068660 dated Sep. 8, 2015 (6 pages).

*Primary Examiner* — Christina A Johnson
*Assistant Examiner* — Xue H Liu
(74) *Attorney, Agent, or Firm* — Osha Liang LLP

(57) ABSTRACT

A mold for in-mold foam-molding of a polyolefin-based resin for producing a molded article includes a first mold part, a second mold part, and a divided mold that holds an insert material, wherein the insert material has a protrusion part, the divided mold is formed on the first and the second mold parts in correspondence with the protrusion part of the insert material, the first mold part has a first holding surface, the second mold part has a divided mold member having a second holding surface and a biasing part that guides the divided mold member movably in the mold opening/closing direction and constantly biases the divided mold member toward the first holding surface, and the base portion of the protrusion part of the insert material is configured for being held between the first and second holding surfaces by the divided mold.

16 Claims, 11 Drawing Sheets

(51) Int. Cl.
  *B29C 67/20* (2006.01)
  *B29C 70/78* (2006.01)
  *B29C 44/44* (2006.01)
  *B29C 44/58* (2006.01)
  *B29L 31/58* (2006.01)
  *B29K 55/00* (2006.01)
  *B29K 105/04* (2006.01)
  *B29K 675/00* (2006.01)
  *B29L 31/00* (2006.01)

(52) U.S. Cl.
  CPC .............. *B29C 67/20* (2013.01); *B29C 70/78* (2013.01); *B29C 44/1271* (2013.01); *B29C 44/445* (2013.01); *B29C 44/58* (2013.01); *B29K 2055/00* (2013.01); *B29K 2105/048* (2013.01); *B29K 2675/00* (2013.01); *B29L 2031/58* (2013.01); *B29L 2031/771* (2013.01)

(58) Field of Classification Search
  USPC ......................................................... 264/259
  See application file for complete search history.

(56) References Cited

FOREIGN PATENT DOCUMENTS

| | | |
|---|---|---|
| JP | 2000158473 A | 6/2000 |
| JP | 2001161508 A | 6/2001 |
| JP | 2006199970 A | 8/2006 |
| JP | 2009061753 A | 3/2009 |
| JP | 2010120336 A | 6/2010 |
| JP | 2011093268 A | 5/2011 |
| JP | 2014128385 A | 7/2014 |
| KR | 2011-0062951 A | 6/2011 |
| WO | 2011112462 A1 | 9/2011 |
| WO | 2014084165 A1 | 6/2014 |

MOLD FOR IN-MOLD FOAM-MOLDING OF POLYOLEFIN-BASED RESIN, METHOD FOR MANUFACTURING IN-MOLD FOAM-MOLDED ARTICLE, AND IN-MOLD FOAM-MOLDED ARTICLE

TECHNICAL FIELD

The present invention relates to a mold for in-mold foam-molding of a polyolefin-based resin, a method for manufacturing an in-mold foam-molded article, and an in-mold foam-molded article that are suitable for embedding and integrally molding an insert material in a foam-molded body.

BACKGROUND

Conventionally, vehicle seats have been generally produced by embedding and integrally molding a metallic wire as an insert material for stabilizing the shape in a seat main body made of polyurethane. In recent years, from the viewpoints of weight saving and cost reduction of vehicles and the like, there has been proposed a structure in which polyurethane and a polyolefin-based resin foam-molded body are combined (refer to Patent Document 1, for example). The invention described in Patent Document 1 has an advantage in that, by using a polyolefin-based resin foam-molded body which is higher in strength than polyurethane for a vehicle seat, the polyolefin-based resin foam-molded body constitutes a core material for stabilizing the seat shape, thereby eliminating the need for a metallic wire that would have been essentially required for stabilizing the shape as a core material in a structure made of only polyurethane. However, a U-shaped hook is necessary to attach the vehicle seat to the vehicle, and the metallic wire needs to be left as an anchor material for fixing the U-shaped hook to the vehicle seat.

Meanwhile, to integrally mold the metallic wire and the polyolefin-based resin foam-molded body, the amount of the metallic wire embedded in the foam-molded body may be smaller because the seat becomes more lightweight. In that case, however, the bonding between the polyolefin-based resin foam-molded body and the metallic wire is weak, and the metallic wire would come off the foam-molded body under a strong impact and the seat might not satisfy safety standard for passengers (anti-submarine). To improve the seat in resistance to impact, the metallic wire embedded in the foam-molded body needs to be made thick, long, or plate-like to increase the strength of the bonding between the metallic wire and the foam-molded body. Therefore, the shape of the metallic wire depends on the shape of the vehicle seat and may take on various shapes. For example, the wire may be annular or the wire may be exposed from the foam-molded body.

As a method for fixing the wire to a mold for integrally molding the foam-molded body and the metallic wire, Patent Document 2 proposes a method by which the outer wall of a lower mold part with a groove for attaching the metallic wire is partially slid by a spring in integral molding of the urethane resin foam-molded body and the metallic wire to allow the metallic wire to be readily installed in the mold when the mold is opened. In addition, Patent Document 2 also proposes a structure in which the metallic wire is fixed in a predetermined position when the mold is closed, and after the molding, the mold release is facilitated by opening the mold.

In addition, there has been proposed a structure for integrally molding a polypropylene-based resin foam-molded body and a metallic wire in which a wire fixing tool provided at a lower mold part is slid by a spring so as to provide almost no clearance between the metallic wire and the mold, and the mold is not completely closed but leaves a slight clearance even at a thin-walled portion into which polypropylene-based resin pr-expanded beads are hard to be filled, so that the polypropylene-based resin pre-expanded beads can undergo cracking-filling to be filled into the thin-walled portion, and when the mold is completely closed after the filling, the wire is fixed to a predetermined position (for example, refer to Patent Document 3).

CITATION LIST

Patent Literature

Patent Document 1: JP-A No. 2001-161508
Patent Document 2: JP-A No. H08-174564
Patent Document 3: JP-A No. H08-057884

SUMMARY

To produce a molded article in which a metallic wire is embedded and integrally molded in a foam-molded body such that the metallic wire partly protrudes outward from the foam-molded body, it is necessary to form openings in both mold parts to lead the protrusion part of the metallic wire protruding laterally from the foam-molded body to the outside of the molding space, in accordance with the base portion of the protrusion part of the metallic wire.

Meanwhile, as a method for filling the pre-expanded beads into the molding space, cracking-filling as described in Patent Document 3 is known as well as pressure filling and compression filling by which the pre-expanded beads are filled in the completely closed mold. In the cracking-filling, while the mold is closed with a slight clearance left, the pre-expanded beads are filled into the molding space, and the mold is completely closed after the filling to perform foam-molding onto the pre-expanded beads in the molding space.

Accordingly, in the case of employing a molding method by which the pre-expanded beads are filled by the cracking-filling to mold a molded article by in-mold foam-molding, when the metallic wire having the protrusion part as described above is embedded and integrally molded in the foam-molded body, the mold is completely closed and the base portion of the protrusion part is held between the holding parts of the both mold parts without clearance. However, according to this configuration, at the time of the cracking-filling, an opening communicating the molding space with a steam chamber is formed between the holding parts of the both mold parts according to a size of the cracking clearance, to leak the pre-expanded beads into the steam chamber through the opening, and the leaked pre-expanded beads form burrs. Accordingly, it is necessary to remove the burrs after the molding, which results in a problem of significant reduction in productivity.

One or more embodiments of the present invention provide a mold for in-mold foam-molding of a polyolefin-based resin, a method for manufacturing an in-mold foam-molded article, and an in-mold foam-molded article that can prevent occurrence of burrs at the base portion of the protrusion part in the mold for molding a molded article by performing the cracking-filling onto pre-expanded beads and insert-molding an insert material such that the protrusion part protrudes laterally from the foam-molded body.

The mold for in-mold foam-molding of a polyolefin-based resin according to one or more embodiments of the present invention is a mold for in-mold foam-molding of a polyolefin-based resin for producing a molded article in a manner that, while an insert material is arranged in a molding space, pre-expanded beads made of a polyolefin-based foamed resin undergo cracking-filling to be filled into the molding space and then the insert material is embedded and integrally molded in a foam-molded body by in-mold foam-molding, in which the insert material has a protrusion part protruding laterally from the foam-molded body relative to an opening/closing direction of the mold, as a divided mold also serving as holding means (or a "divided mold") for both mold parts in correspondence with the protrusion part of the insert material, a first mold part has a first holding surface opposed to a base portion of the protrusion part protruding to the outside of the molding space, and a second mold part has a divided mold also serving as holding member (or a "divided mold member") having a second holding surface opposed to the first holding surface and a biasing means (or a "biasing part") that guides the divided mold also serving as holding member movably in the mold opening/closing direction and constantly biases the divided mold also serving as holding member toward the first holding surface, and the base portion of the protrusion part of the insert material is capable of being held between the both holding surfaces by the divided mold also serving as holding means in the state in which the both mold parts are completely closed and the state in which a cracking clearance left between the both mold parts. The first holding surface may be integrally formed in the first mold part, or may be formed in a separate member detachably provided on the first mold part so that the separate member is fixed to the first mold part to form the first holding surface in the first mold part. In addition, the protrusion part can be protruded at an arbitrary angle laterally from the foam-molded body in the opening/closing direction of the mold. For example, the protrusion part can be protruded in a direction almost orthogonal to the opening/closing direction of the mold.

To produce a molded article by the use of the mold, first, the insert material is attached to one of the mold parts such that, when the both mold parts are closed, the protrusion part of the insert material protrudes to the outside of the molding space and the other part of the insert material is arranged in the molding space. Next, the both mold parts are closed with the cracking clearance. At this time, by the biasing force of the biasing means for biasing the divided mold also serving as holding member toward the first holding surface, the base portion of the protrusion part is held between the first holding surface of the first mold part and the second holding surface of the divided mold also serving as holding member, thereby preventing the formation of an opening according to the cracking clearance between the both mold parts in the position corresponding to the base portion of the protrusion part. Next, the pre-expanded beads undergo the cracking-filling to be filled into the molding space. The cracking clearance is formed between the mold parts except for the position corresponding to the divided mold also serving as holding member, in a manner as not to allow the pre-expanded beads to pass therethrough. In addition, the position corresponding to the divided mold also serving as holding member where the base portion of the protrusion part is arranged is closed by the divided mold also serving as holding member without formation of the opening. This prevents a problem that the pre-expanded beads leak from the molding space through the opening to the steam chamber. Accordingly, when the pre-expanded beads are filled into the molding space and the both mold parts are completely closed, the cracking clearance is closed, the divided mold also serving as holding member moves backward while holding the base portion of the protrusion part between the first holding surface and the second holding surface against the biasing force of the biasing means, and the both mold parts are completely closed. In this state, the pre-expanded beads in the molding space are heated and fused, thereby producing a molded article in which the protrusion part of the insert material protrudes outward from the foam-molded body. However, in the state in which the opening is closed by the divided mold also serving as holding member, the opening does not need to be completely closed but they may have therebetween a clearance through which the pre-expanded beads cannot pass. That is, the opening only needs to be configured to have no clearance through which the pre-expanded beads can pass.

In the mold, as the divided mold also serving as holding means for both mold parts, the first mold part has the first holding surface opposed to the base portion of the protrusion part protruding to the outside of the molding space, and the second mold part has the divided mold also serving as holding member that has the second holding surface opposed to the first holding surface and the biasing means that guides the divided mold also serving as holding member to be movable in the mold opening/closing direction and constantly biases the divided mold also serving as holding member toward the first holding surface. By such a simple configuration, it is possible to prevent the formation of an opening according to the cracking clearance between the both mold parts in a position corresponding to the base portion of the protrusion part at the time of the cracking-filling of the pre-expanded beads, and prevent a problem that some of the pre-expanded beads filled in the molding space leak through the opening and the leaked pre-expanded beads form burrs in the molded article. Accordingly, using the mold eliminates the need for removing the burrs after the molding, thereby improving productivity of molded articles.

At least one of the first holding surface and the second holding surface may have a groove part in which the base portion of the protrusion part can be fitted. According to this configuration, the insert material can be set stably in the molding space with the base portion of the protrusion part being fitted in the groove part. In addition, by setting the opening width and depth of the groove part properly, it is possible to easily and reliably prevent the leakage of the pre-expanded beads from the clearance between the groove part and the protrusion part into the steam chamber at the time of the cracking-filling.

The first holding surface or the second holding surface may have a magnet for attracting and holding the base portion of the protrusion part, so that the insert material can be fixed and held in the first mold part or the second mold part. In this case, when the both mold parts are opened, the insert material can be easily fixed to the first mold part or the second mold part. In addition, it is possible to prevent deformation of the insert material due to dimensional deviation resulting from a level of the fabrication accuracy of the insert material or linear expansion at the time of heating when the insert material is attached to the first mold part or the second mold part or in-mold foam-molding is performed by heating, expanding, and fusing the pre-expanded beads. Accordingly, the foam-molded body can be integrally molded with the insert material in the natural state. Therefore, it is possible to almost completely eliminate the force of the insert material returning to the original shape after the molding of the molded article, and prevent the deformation of the molded article after the molding.

The biasing means may include a bracket integrally molded in the second mold part, a guide rod that is provided to the bracket to be movable in the mold opening/closing direction, and a biasing member that constantly biases the guide rod toward the first holding surface, and the divided mold also serving as holding member is attached to a tip of the guide rod. The bracket may be formed as a member separated from the second mold part. However, in order to decrease the manufacturing cost for the mold and enhance the accuracy of assembling the divided mold also serving as holding member, the bracket may be integrally molded in the second mold part.

The bracket may be provided with a sleeve guiding the guide rod in the mold opening/closing direction. In this case, it is possible to reduce sliding resistance between the guide rod and the bracket so that the guide rod can smoothly move in the mold opening/closing direction.

The divided mold also serving as holding member may be detachably provided on the biasing means. According to this configuration, even when the sliding portions or the like between the second mold part and the divided mold also serving as holding member are worn out, it is possible to easily repair the mold by replacing the divided mold also serving as holding member or the like.

The insert material may be composed of a molded article fastening member having an anchor material and a plurality of fasteners added to the anchor material, and the protrusion part is formed at least on part of the anchor material or the fasteners. According to this configuration, it is possible to fix the molded article by the use of the protrusion part on at least one of the anchor material and the fasteners.

The molded article may be a vehicle seat core material. In this case, it is possible to enhance the shape retention of the vehicle seat core material by the insert material and fix the vehicle seat core material to the vehicle by the use of the protrusion part of the insert material.

A method for manufacturing an in-mold foam-molded article according to one or more embodiments of the present invention is a method for manufacturing an in-mold foam-molded article by which, while an insert material is arranged in a molding space, pre-expanded beads made of a polyolefin-based foamed resin undergo cracking-filling to be filled into the molding space, and then the insert material is embedded and integrally molded in a foam-molded body by in-mold foam-molding, in which the insert material has a protrusion part protruding laterally from the foam-molded body relative to an opening/closing direction of a mold for molding the in-mold foam-molded article, at the time of cracking-filling when a cracking clearance is formed between a first mold part and a second mold part, in the state in which a base portion of the protrusion part protruding to the outside of the molding space in the insert material arranged in the molding space is held between a first holding surface of the first mold part and a second holding surface of a divided mold also serving as holding member of the second mold part, movable in the mold opening/closing direction and biased toward the first holding surface, such that no clearance allowing the pre-expanded beads to pass is formed between the both mold parts in a position corresponding to the base portion of the protrusion part, the pre-expanded beads undergo cracking-filling to be filled into the molding space, and after the cracking-filling, while the base portion of the protrusion part is held between the first holding surface and the second holding surface, the first mold part and the second mold part are completely closed and the pre-expanded beads in the molding space are heated and fused.

According to this manufacturing method, the pre-expanded beads undergo the cracking-filling in the state in which the base portion of the protrusion part is held between the first holding surface of the first mold part and the second holding surface of the divided mold also serving as holding member of the second mold part that is movable in the mold opening/closing direction and biased toward the first holding surface such that no clearance through which the pre-expanded beads can pass is formed between the both mold parts in the position corresponding to the base portion of the protrusion part. This makes it possible to prevent the formation of an opening according to the cracking clearance between the both mold parts in the position corresponding to the base portion of the protrusion part, and prevent a problem that some of the pre-expanded beads filled in the molding space leak through the opening and the leaked pre-expanded beads form burrs in the molded article. Accordingly, this manufacturing method eliminates the need for removing the burrs after the molding, thereby improving productivity for the molded article.

A groove part may be formed in which the protrusion part can be fitted on at least one of the first holding surface and the second holding surface. According to this configuration, the insert material can be set stably in the molding space with the base portion of the protrusion part being fitted in the groove part. In addition, by setting the opening width and depth of the groove part properly, it is possible to easily and reliably prevent the leakage of the pre-expanded beads from the clearance between the groove part and the protrusion part into the steam chamber at the time of the cracking-filling.

The molded article may be a vehicle seat core material. In this case, it is possible to enhance the shape retention of the vehicle seat core material by the insert material, and to fix the vehicle seat core material to the vehicle by the use of the protrusion part of the insert material.

An in-mold foam-molded article according to one or more embodiments of the present invention is an in-mold foam-molded article manufactured by the method for manufacturing an in-mold foam-molded article, in which the insert material embedded and integrally molded in the foam-molded body is provided with a protrusion part that protrudes laterally from the foam-molded body relative to the opening/closing direction of the mold for molding the in-mold foam-molded article.

In the in-mold foam-molded article, the insert material embedded and integrally molded in the foam-molded body is provided with the protrusion part that protrudes laterally from the foam-molded body relative to the opening/closing direction of the mold for molding the in-mold foam-molded article. The manufacturing method is employed to thereby obtain an in-mold foam-molded article that does not need to remove burrs from the base end portion of the protrusion part and its surroundings after molding, and is excellent in productivity.

According to the mold for in-mold foam-molding of a polyolefin-based resin and the method for manufacturing an in-mold foam-molded article of one or more embodiments of the present invention, as the divided mold also serving as holding means on the both mold parts, the first mold pan has the first holding surface opposed to the base portion of the protrusion part protruding to the outside of the molding space, and the second mold part has the divided mold also serving as holding member having the second holding surface opposed to the first holding surface and the biasing means that guides the divided mold also serving as holding member movably in the mold opening/closing direction and constantly biases the divided mold also serving as holding member toward the first holding surface. By such a simple configuration, it is possible to prevent the formation of an opening according to the cracking clearance between the both mold parts in the position corresponding to the base portion of the protrusion part at the time of cracking-filling the pre-expanded beads, and prevent a problem that some of the pre-expanded beads filled in the molding space leak through the opening and the leaked pre-expanded beads form burrs in the molded article. Accordingly, using the mold eliminates the need for removing the burrs after the molding with productivity improvement for molded articles.

According to the in-mold foam-molded article of one or more embodiments of the present invention, it is possible to realize an in-mold foam-molded article that does not need to remove burrs from the base end portion of the protrusion part and its surroundings after molding and is excellent in productivity.

DESCRIPTION OF EMBODIMENTS

One or more embodiment of the present invention will be described below with reference to the drawings.

First, a configuration of a molded article molded with a mold according to one or more embodiments of the present invention will be described. In the embodiment, a vehicle sheet core material is molded as the molded article.

Figure 1:
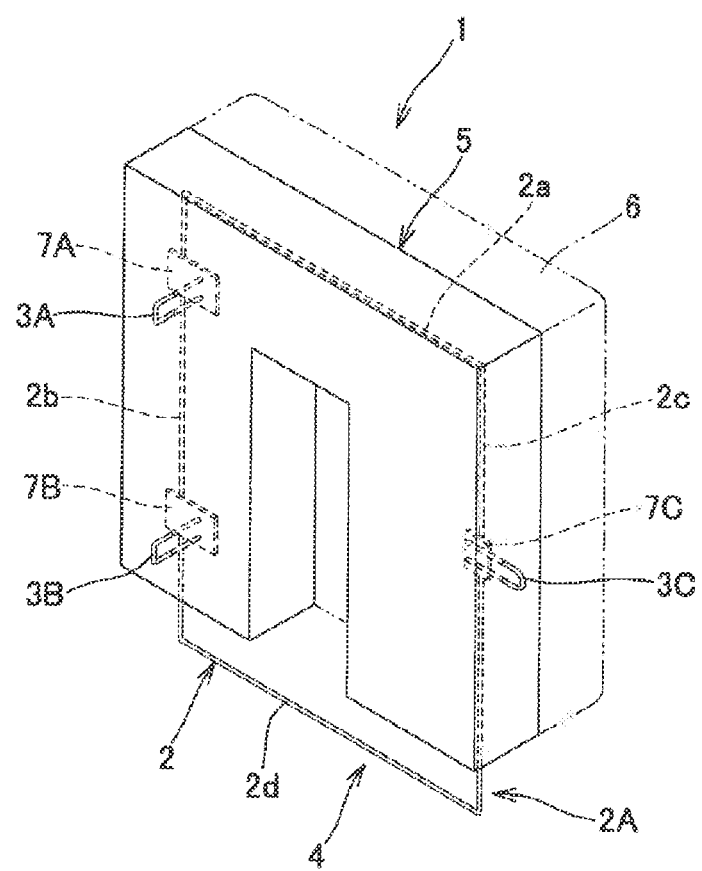
FIG. 1 is a perspective view of a molded article placed in portrait.
Figure 2:
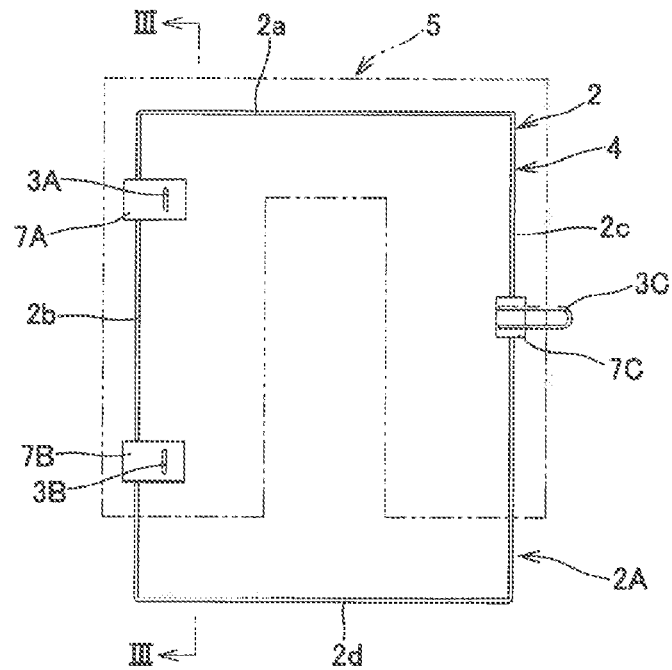
FIG. 2 is a bottom view of the molded article.
Figure 3:
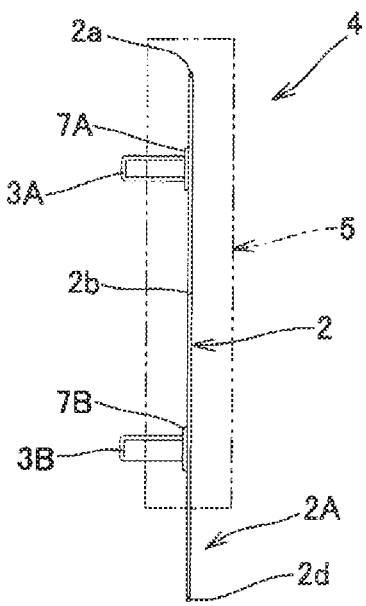
FIG. 3 is a cross-sectional view of FIG. 2 taken along line III-III.

As illustrated in FIGS. 1 to 3, a molded article 1 includes a molded article fastening member 4 as an insert material having an anchor material 2 and a plurality of fasteners 3 added to an anchor material 2, and a foam-molded body 5 made of a polyolefin-based foamed resin in which the molded article fastening member 4 is embedded and integrally molded. The molded article fastening member 4 is integrally molded by in-mold foam-molding such that at least part of at least one of the anchor material 2 and the fasteners 3 protrudes outward as a protrusion part from the foam-molded body 5, and the part of the molded article fastening member 4 other than the protrusion part is embedded in the foam-molded body 5. FIG. 1 is a perspective view of a seat cushion core material for automobile as the molded article 1 (hereinafter, referred to as seat core material) in portrait orientation. The seat core material is manufactured by integrally molding a molded body 6 made of polyurethane in the upper side of the foam-molded body 5 in the molded article 1 as shown by a virtual line.

More specifically, the foam-molded body 5 is formed in an almost U-shaped thick plate shape of a size fitted to the seat cushion. The anchor material 2 is formed by folding a metallic wire of iron, stainless steel, or the like in a rectangular frame shape and welding its both ends. Describing with the definitions of the upper, lower, right, and left sides with reference to FIG. 2, an upper anchor 2a arranged on the upper side and the upper parts of side anchors 2b and 2c arranged on the right and left sides are embedded in the foam-molded body 5 along the outer side surfaces of the foam-molded body 5, and the lower parts of the left and right side anchors 2b and 2c and a lower anchor 2d arranged on the lower side are protruded downward from the foam-molded body 5 and exposed to the outside. A pair of upper and lower attachment plates 7A and 7B is fixed to the left side anchor 2b with a space therebetween, and one attachment plate 7C is fixed to the height-direction central part of the right side anchor 2c. The three attachment plates 7A to 7C are embedded in the foam-molded body 5. A first fastener 3A composed of a U-shaped hook protruding forward (downward in the state of being assembled in the vehicle body) is fixed to the upper left attachment plate 7A, and the front part of the first fastener 3A is protruded forward from the foam-molded body 5. A second fastener 3B composed of a U-shaped hook protruding forward (downward in the state of being assembled in the vehicle body) is fixed to the lower left attachment plate 7B, and the front part of the second fastener 3B is protruded forward from the foam-molded body 5. A third fastener 3C composed of a U-shaped hook protruding rightward is fixed to the right attachment plate 7C, and the right part of the third fastener 3C is protruded rightward from the foam-molded body 5. The molded article 1 is fixed to the vehicle body by fixing these three fasteners 3A to 3C to the vehicle body members. The fasteners 3A to 3C may be hereinafter collectively called fasteners 3, and the attachment plates 7A to 7C may be hereinafter collectively called attachment plates 7.

The part of the molded article fastening member 4 protruding in the vertical and horizontal directions from the foam-molded body 5, that is, the part of the molded article fastening member 4 protruding in the directions orthogonal to an opening/closing direction of the mold at the time of molding of the molded article 1 constitutes the protrusion part. Specifically, the U-shaped anchor protrusion part 2A on the lower side of the anchor material 2 and the U-shaped part as the leading end-side half of the third fastener 3C correspond to the protrusion part. However, the protrusion part may protrude at an arbitrary angle relative to the mold opening/closing direction.

The anchor material 2 may be formed from a metallic material such as iron or stainless steel, or a synthetic resin material, in a long and thin pipe shape, a bar shape, a plate shape, a square or rectangular plate shape, or any other arbitrary shape. In addition, the anchor material 2 can be formed in an arbitrary frame shape according to the seat shape or in a linear shape or a U shape as far as it has the function of fixing the fasteners 3 to the foam-molded body 5. Further, the exposed part of the anchor material 2 from the foam-molded body 5 can be appropriately set according to the shape of the vehicle seat or the like, or no exposed part may be formed. In addition, the number, arrangement positions, and shape of the fasteners 3 can be arbitrarily set according to the configuration of the vehicle. Further, although the fasteners 3 are fixed to the anchor material 2 via the attachment plates 7, the fasteners 3 may be fixed directly to the anchor material 2.

The size and shape of the foam-molded body 5 can be appropriately decided depending on the size and shape of the vehicle seat. The polyolefin-based resin constituting the foam-molded body 5 is a polymer containing 75 weight % or more of olefin-based monomer.

(Polyolefin-Based Resin)

Specific examples of olefin-based monomer are α-olefins with carbon numbers of 2 to 12 such as ethylene, propylene, butene-1, isobutene, pentene-1, 3-methyl-butene-1, hexene-1, 4-methyl-pentene-1, 3,4-dimethyl-butene-1, heptene-1,3-methyl-hexene-1, octene-1, and decene-1. They may be used singly or in combination of two or more of them.

In addition, other specific examples of monomer copolymerizable with the olefin-based monomer are cyclic olefins such as cyclopentene, norbornene, 1,4,5,8-dimethano-1,2,3,4,4a,8,8a,6-octahydronaphthalene, and dienes such as 5-methylene-2-norbornene, 5-ethyl idene-2-norbornene, 1,4-hexadiene, methyl-1,4-hexadiene, 7-methyl-1,6-octadiene. They may be used singly or in combination of two or more of them.

Specific examples of polyolefin-based resins are polyethylene-based resins with ethylene as a main component such as a high-density polyethylene, a medium-density polyethylene, a low-density polyethylene, and a linear low-density polyethylene, and polypropylene-based resins with propylene as a main component. These polyolefin-based resins may be used singly or in combination of two or more of them.

There is no particular limitation on the polypropylene-based resin as far as it contains propylene as a main component of the monomer. For example, the polypropylene-based resin may be a propylene homopolymer, an α-olefin-propylene random copolymer, an α-olefin-propylene block copolymer, or the like. They may be used singly or in combination of two or more of them.

In particular, polypropylene-based resins containing α-olefin that is ethylene as a comonomer component may be used for in-mold foaming molding because of their availability and moldability.

There is no particular limitation on the polypropylene-based resin as far as it contains propylene as a main component of monomer. For example, the polypropylene-based resin may be a propylene homopolymer, an olefin-propylene random copolymer, an olefin-propylene block copolymer, or the like.

They may be used singly or in combination of two or more of them.

The polyethylene-based resin for use in one or more embodiments of the present invention may be an ethylene homopolymer, an ethylene-α-olefin random copolymer, an ethylene-α-olefin block copolymer, a low-density polyethylene, a high-density polyethylene, a linear low-density polyethylene, or the like. The α-olefins here include α-olefins with carbon numbers of 3 to 15 and the like. They may be used singly or in combination of two or more of them.

Among these polyethylene-based resins, an ethylene-α-olefin block copolymer with a comonomer content of 1 to 10 weight % other than ethylene or a linear low-density polyethylene exhibits favorable foaming property and is suitably used for in-mold foam-molding.

The polyolefin-based resin for use in one or more embodiments of the present invention can be used as a polyolefin-based resin composition mixed, depending on the necessity, with a cell nucleating agent such as talc, stabilizers such as an antioxidant, a metal deactivator, a phosphorus-based processing stabilizer, an ultraviolet absorber, an ultraviolet stabilizer, a fluorescent brightener, and a metallic soap, or additives such as a cross-linker, a chain transfer agent, a lubricant, a plasticizer, a filler, a toughening agent, an inorganic pigment, an organic pigment, a conductive modifier, a flame retardant modifier, a surfactant-type or high-molecular antistatic agent.

The polyolefin-based resin composition for use in one or more embodiments of the present invention is generally formed by melting and mixing in advance a polyolefin-based resin with the additives described above, depending on the necessity, by the use of an extruder, a kneader, a Banbury mixer, a roller, or the like, and then molding the same into polyolefin-based resin particles in a desired shape such as a circular column, an ellipse, a sphere, a cube, a rectangular parallelepiped, or the like, so that the polyolefin-based resin particles can be easily used for pre-expanding.

There is no particular limitation on the method for manufacturing the polyolefin-based resin pre-expanded beads for use in one or more embodiments of the present invention. However, one or more embodiments use decompression foaming by which polyolefin-based resin particles are dispersed with a dispersant and the like, in a dispersion medium, in the presence of a foaming agent in an airtight container, they are heated under pressure to a predetermined foaming temperature and the resin particles are impregnated with the foaming agent, and then the dispersed substances in the airtight container is released and foamed to a low-pressure area with the temperature and the pressure in the container kept at constant levels.

The heating temperature in the airtight container may fall within the range of the melting point of the polyolefin-based resin particles −25° C. to the melting point of the polyolefin-based resin particles +25° C., further may fall within the range of the melting point of the polyolefin-based resin particles −15° C. to the melting point of the polyolefin-based resin particles +15° C. The polyolefin-based resin particles are heated to the foregoing temperature and pressurized to impregnate the polyolefin-based resin particles with the foaming agent, and one end of the airtight container is opened to release the polyolefin-based resin particles into an atmosphere of lower pressure than that in the airtight container, thereby manufacturing the polyolefin-based resin pre-expanded beads.

There is no particular limitation on the foaming agent for manufacturing the polyolefin-based resin pre-expanded beads. For example, the foaming agent can be an aliphatic hydrocarbon such as propane, isobutane, normal butane, isopentane, or normal pentane; inorganic gas such as air, nitrogen, or carbon dioxide; water; or a mixture of these.

(Mold Apparatus)

Next, a configuration of a mold apparatus will be described.

As illustrated in FIGS. 4 to 12, a mold apparatus M for in-mold foam-molding includes a concave mold unit 10 having a concave mold part 11 and a concave mold housing 12 holding the concave mold part 11, a convex mold unit 20 having a convex mold part 21 and a convex mold housing 22 holding the convex mold part 21, and a holding means fixing and holding a molded article fastening member 4 as an insert material between the concave mold unit 10 and the convex mold unit 20. The molded article fastening member 4 is fixed and held in the convex mold unit 20 by the holding means, the concave mold unit 10 and the convex mold unit 20 are combined, and the embedded part of the molded article fastening member 4 is fixed and held in a molding space CA formed by the concave mold part 11 and the convex mold part 21 as the mold. In this state, foaming resin particles are filled in the molding space CA, and the foaming resin particles in the molding space CA are heated, expanded, and fused to obtain the molded article 1 in which the molded article fastening member 4 is embedded and integrally molded in the foam-molded body 5 with the protrusion part protruding laterally.

The mold composed of the concave mold part 11 and the convex mold part 21 are formed from a casting of low specific heat and high thermal conductivity, for example, an aluminum alloy so that the molded article 1 can be smoothly heated and cooled. The both housings 12 and 22 are formed from an iron-based metal to decrease manufacturing costs for the mold apparatus M and assure sufficient strength and stiffness.

The concave mold housing 12 has a rectangular cylindrical concave mold frame 13, the concave mold part 11 that is fixed to the concave mold frame 13 via a center plate 14 to close the opening in the concave mold frame 13 on the front side (the mating surface side of the mold), and a concave mold back plate 15 that closes the opening in the concave mold frame 13 on the back side. The concave mold housing 12 has therein a concave mold chamber 16 on the back side of the concave mold part 11.

The concave mold unit 10 is connected to a steam supply pipe 18a, a cooling water supply pipe 18b, and a drain pipe 18c which are opened to the concave mold chamber 16. Control valves 19a to 19c are interposed in the middle parts of these pipes 18a to 18c and are operated to supply steam into the concave mold chamber 16 to heat and expand the foaming resin particles, jet cooling water from nozzles 18d onto the back side of the concave mold part 11 to cool the molded article 1, and discharge an unnecessary drain out of the concave mold chamber 16. The concave mold part 11 has a large number of vent holes 11a through which steam is supplied from the concave mold chamber 16 into the molding space CA. A filling gun 17 is fixed to the concave mold back plate 15. The tip of the filling gun 17 is opened to the molding space CA through the concave mold part 11. The foaming resin particles are supplied from the filling gun 17 into the molding space CA and filled in the molding space CA. Although not illustrated, an ejector pin capable of being inserted through the concave mold part 11 and protruding into the molding space CA is inserted into and supported by the concave mold back plate 15.

The convex mold housing 22 has a rectangular cylindrical convex mold frame 23, a convex mold part 21 that is fixed to the convex mold frame 23 via a center plate 24 to close the opening in the convex mold frame 23 on the front side (mating surface side of the mold part), and a convex mold back plate 25 to close the opening in the convex mold frame 23 on the back side. The convex mold housing 22 has therein a convex mold chamber 26 on the back side of the convex mold part 21.

The convex mold unit 20 has a steam supply pipe 28a, a cooling water supply pipe 28b, and a drain pipe 28c which are opened to the convex mold chamber 26. Control valves 29a to 29c are interposed in the middle parts of these pipes 28a to 28c and are operated to supply steam into the convex mold chamber 26 to heat and expand the foaming resin particles, jet cooling water from nozzles 28d onto the back side of the convex mold part 21 to cool the molded article 1, and discharge an unnecessary drain out of the convex mold chamber 26. The convex mold part 21 has a large number of vent holes 21a through which steam is supplied from the convex mold chamber 26 into the molding space CA.

(Holding Means)

The mold composed of the concave mold part 11 and the convex mold part 21 according to one or more embodiments of the present invention include, as holding means for fixing and holding the molded article fastening member 4 in the mold apparatus M as described above, a pair of holding means 30 that holds the first fastener 3A and the second fastener 3B of the molded article fastening member 4 in the concave mold part 11 and the convex mold part 21, a pair of divided mold also serving as holding means 40A that holds the base portion of the U-shaped anchor protrusion part 2A of the anchor material 2 protruding outward from the foam-molded body 5, and a divided mold also serving as holding means 40B that holds the third fastener 3C protruding outward from the foam-molded body 5, as illustrated in FIGS. 4 to 11. The mold apparatus M may be configured in the same manner as any known mold apparatus M as far as it includes at least one divided mold also serving as holding member.

First, the pair of holding means 30 fixing and holding the first fastener 3A and the second fastener 3B will be described. The holding means 30 are configured in the same manner except for the held fasteners 3A and 3B and the arrangement positions in the mold. Accordingly, only the holding means 30 fixing and holding the second fastener 3B will be described below, and descriptions of the holding means 30 fixing and holding the first fastener 3A will be omitted with the same reference signs given to the same members as those of the holding means 30 fixing and holding the second fastener 3B.

As illustrated in FIGS. 4 to 9 and 11, the holding means 30 includes a holding member 33 having a fitting concave part 32 that is provided on a side close to the convex mold part 21 and holds the second fastener 3B in such a manner as to prevent the second fastener 3B from relatively moving, a holding member biasing means 34 that biases the holding member 33 to protrude toward the concave mold part 11, and a holding surface 39a that is provided in the concave mold part 11 in such a manner as to allow the concave mold part 11 to abut on the tip of the holding member 33. While the second fastener 3B is positioned and fitted in the fitting concave part 32, the attachment plate 7A of the second fastener 3B is sandwiched between the tip of the holding member 33 and the holding surface 39a by biasing force of the holding member biasing means 34, thereby to position and hold the second fastener 3B between the concave mold part 11 and the convex mold part 21.

The holding member 33 is formed by a flat-bottomed metallic pipe-like member. The holding member 33 has in the center a thin and long hole-like fitting concave part 32 extending in the mold opening/closing direction in which the second fastener 3B is detachably fitted almost without clearance. However, the fitting concave part 32 may be configured in an arbitrary manner according to the shape of the second fastener 3B or the like as far as it can hold the second fastener 3B.

Figure 5:
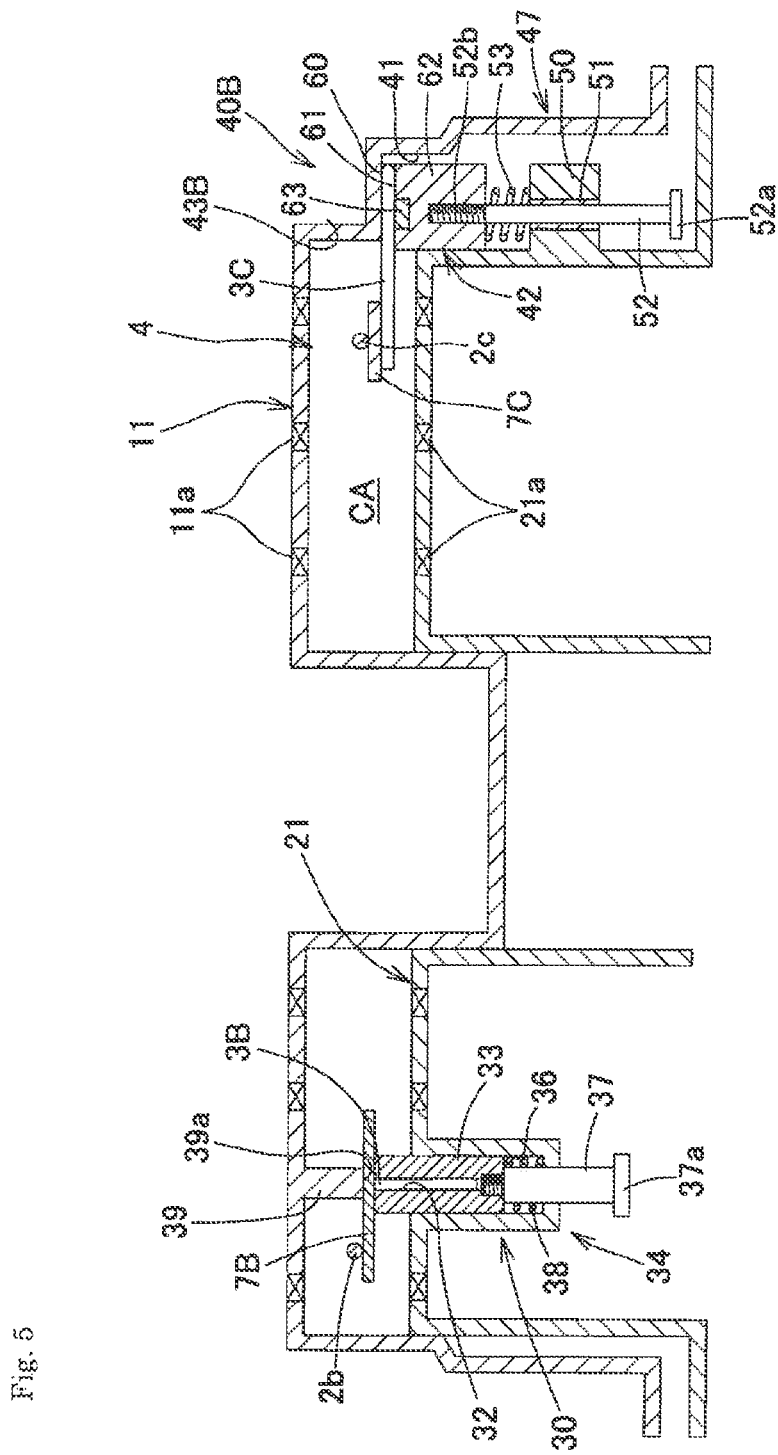
FIG. 5 is a cross-sectional view of FIG. 4A taken along line V-V in which the mold is closed.
Figure 6:
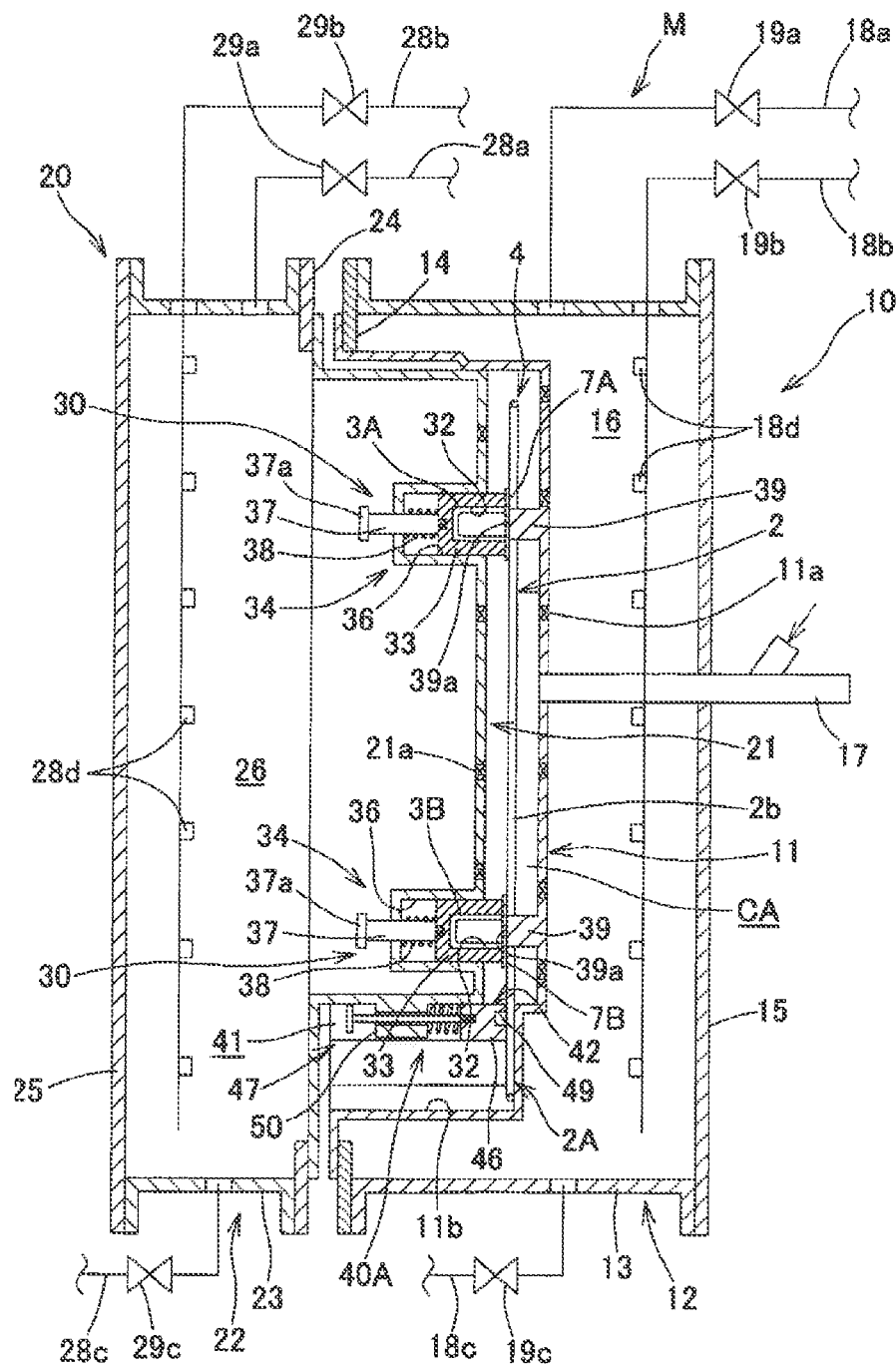
FIG. 6 is a cross-sectional view of FIG. 4A taken along line VI-VI in which the mold is closed.
Figure 7:
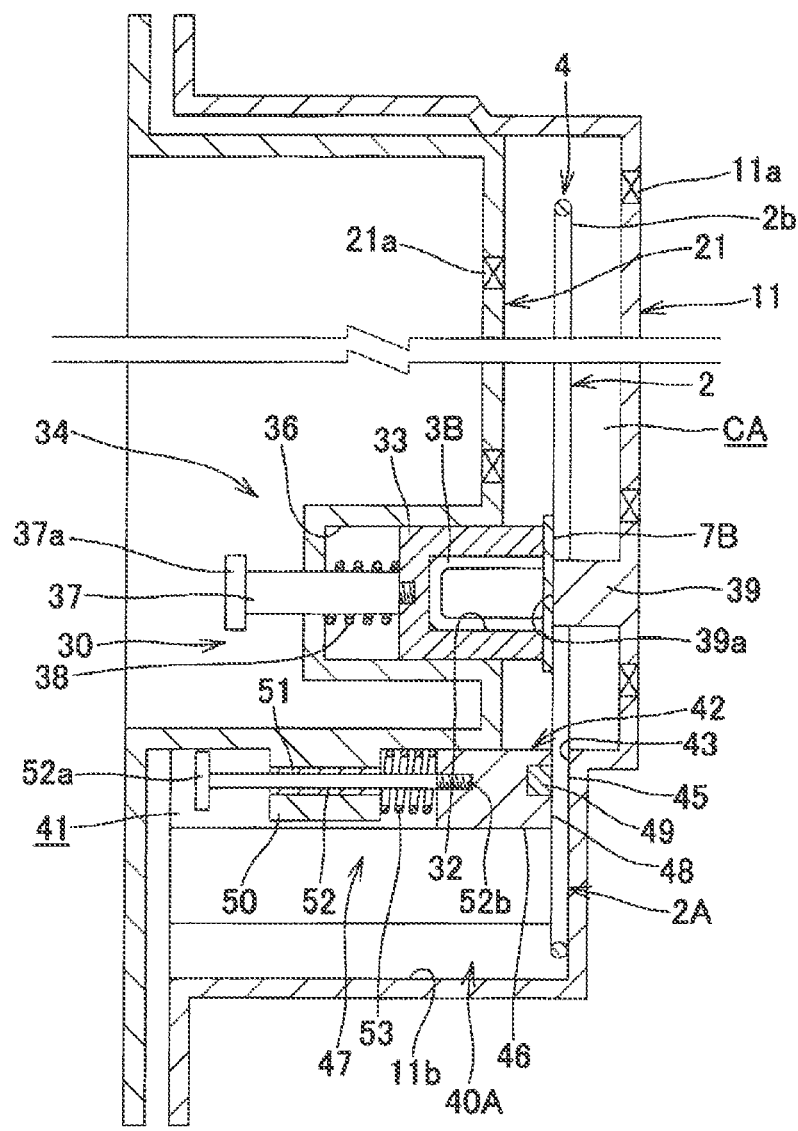
FIG. 7 is an enlarged view of main components illustrated in FIG. 6.
Figure 8:
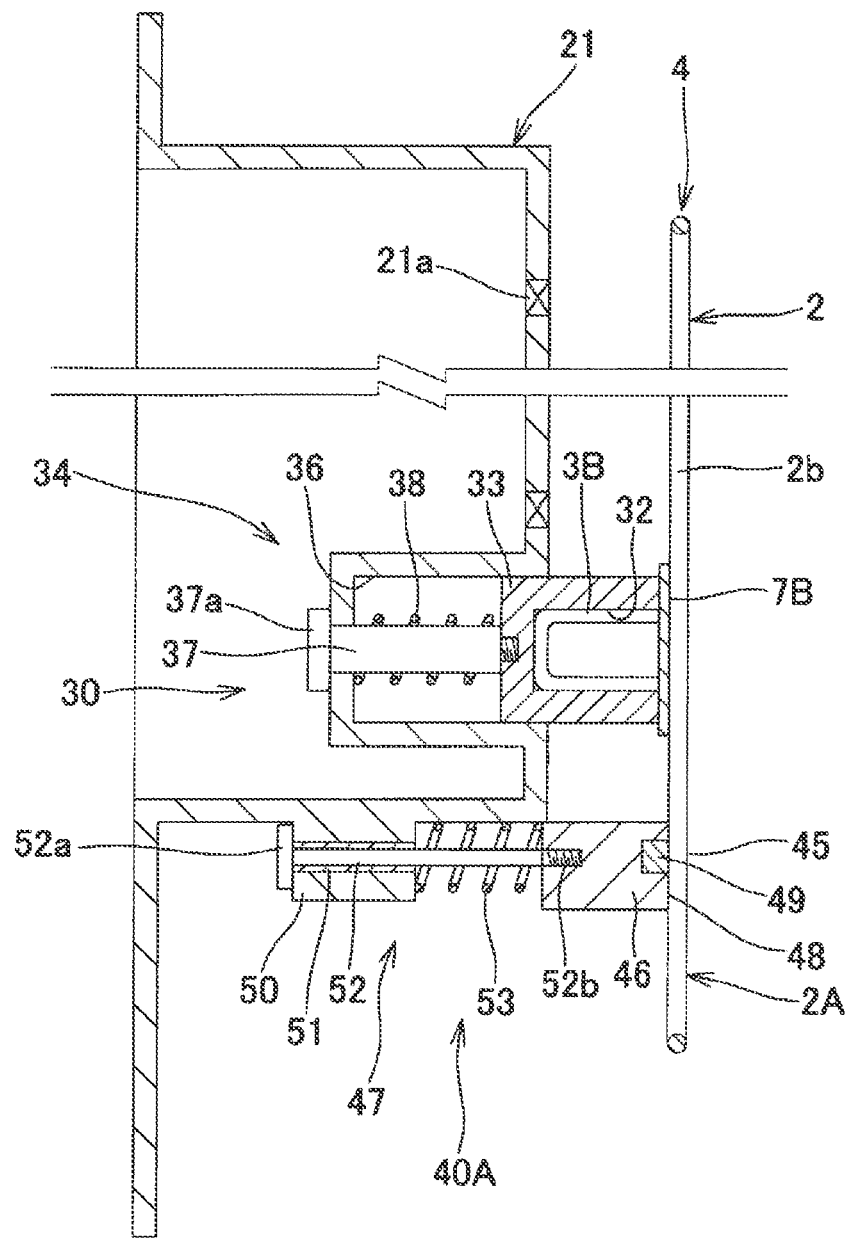
FIG. 8 is a vertical cross-sectional view of main components of the convex mold part with a molded article fastening member.
Figure 9:
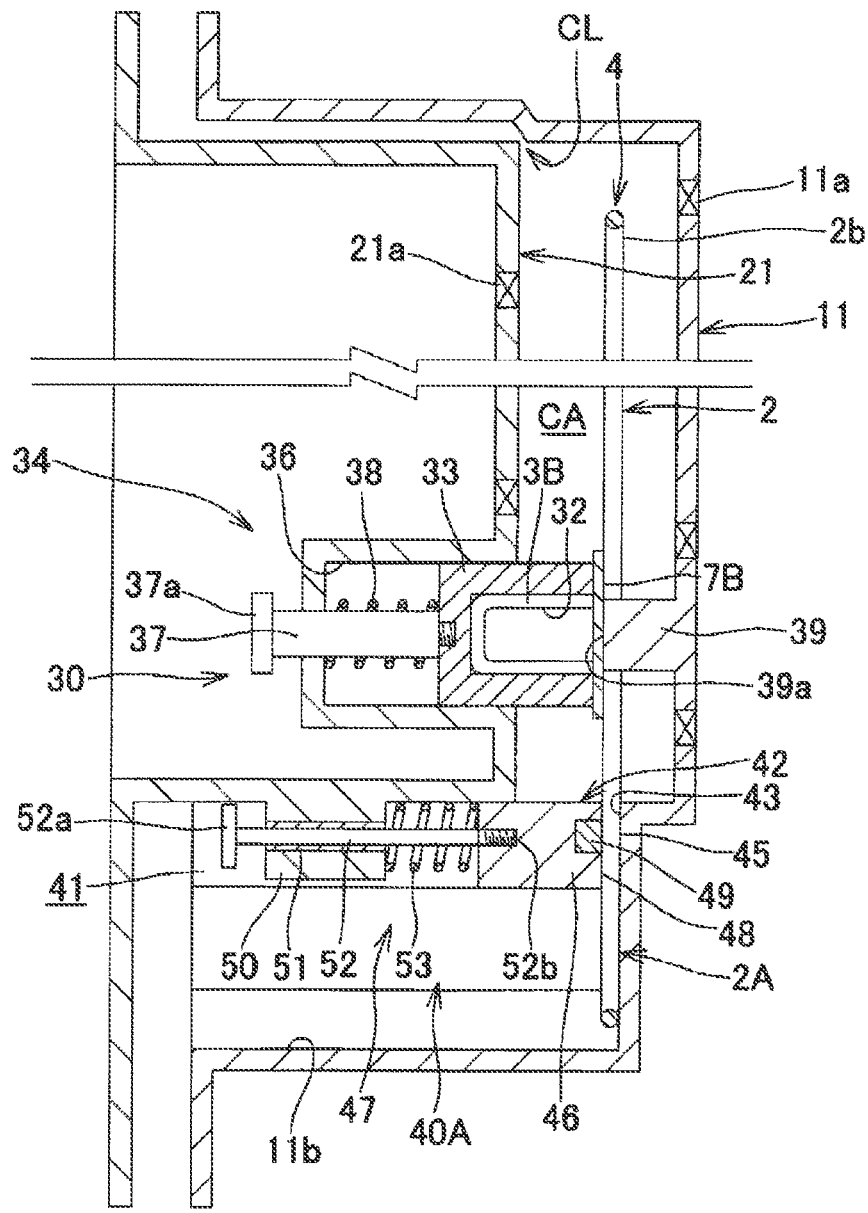
FIG. 9 is a vertical cross-sectional view of main components of the mold at the time of cracking-filling.

The holding member biasing means 34 includes a guide rod 37 that has the tip fixed to the holding member 33 and the middle portion penetrating through the bottom portion of a storage concave part 36 storing the holding member 33 and protruding toward the back surface side of the convex mold part 21, and a spring member 38 that is composed of a compression coil spring fitted as a biasing member onto the guide rod 37 between the holding member 33 and the bottom portion of the storage concave part 36 to constantly bias the holding member 33 toward the concave mold part 11 as illustrated in FIGS. 4 to 9. The guide rod 37 has at the back end part a stopper 37a that is capable of abutting against the back surface side of the bottom portion of the storage concave part 36. As illustrated in FIG. 8, while the mold is opened, the holding member 33 protrudes toward the concave mold part 11 by a specific distance so as not to come off the storage concave part 36. The concave mold part 11 has a pressure-receiving projection 39 protruding into the molding space CA in a position corresponding to the holding member 33. The pressure-receiving projection 39 has a holding surface 39a at the tip. As illustrated in FIG. 8, while the concave mold part 11 and the convex mold part 21 are opened, the first fastener 3A is fitted into the fitting concave part 32 in the convex mold part 21 and the molded article fastening member 4 is positioned and held in the convex mold part 21, and then the concave mold part 11 and the convex mold part 21 are closed. Accordingly, as illustrated in FIG. 7, the attachment plate 7A is sandwiched between the tip of the holding member 33 and the holding surface 39a of the pressure-receiving projection 39 in the state in which the concave mold part 11 and the convex mold part 21 are completely closed as illustrated in FIG. 7 and the state in which they are closed with the cracking clearance CL therebetween as illustrated in FIG. 9, thereby to position and hold the molded article fastening member 4.

(Divided Mold Also Serving as Holding Means)

Next, the pair of divided mold also serving as holding means 40A that holds the side anchors 2b and 2c at the base portion of the U-shaped anchor protrusion part 2A of the anchor material 2 protruding outward from the foam-molded body 5 will be described. The two divided mold also serving as holding means 40A are configured in the same manner except for the held side anchors 2b and 2c and the arrangement positions in the mold. Accordingly, only the divided mold also serving as holding means 40A holding the side anchor 2b illustrated on the right side of FIG. 4B will be described, and descriptions of the divided mold also serving as holding means 40A holding the side anchor 2c illustrated on the left side of FIG. 4B will be omitted with the same reference signs given to the same members as those of the divided mold also serving as holding means 40A on the right side.

As illustrated in FIGS. 4 and 6 to 11, the concave mold part 11 has a groove part 11b that stores the anchor protrusion part 2A protruding to the outside of the molding space CA. In addition, the concave mold part 11 has a storage concave part 41 protruding toward the concave mold chamber 16 and connecting to the base end portion of the groove part 11b in correspondence with the base portion of the side anchor 2b protruding outward from the molding space CA. The storage concave part 41 has approximately rectangular openings 42 that are opened to the inside of the concave mold part 11 along the entire length in the mold opening/closing direction, and a first holding surface 43 opposed to the base portion of the side anchor 2b protruding outward from the molding space CA on the end surface of the storage concave part 41 on the deep side in the mold opening/closing direction. However, the first holding surface 43 may be formed on a separate member that is fixed to the end portion of the storage concave part 41 on the deep side.

The convex mold part 21 includes a divided mold also serving as holding member 46 that has a second holding surface 45 opposed to the first holding surface 43 and is fitted into the storage concave part 41 by closing the mold to constitute part of the concave mold part 11 and a divided mold biasing means 47 that guides the divided mold also serving as holding member 46 movably in the mold opening/closing direction and constantly biases the divided mold also serving as holding member 46 toward the first holding surface 43.

The divided mold also serving as holding member 46 is formed in a rectangular block shape. The width of the divided mold also serving as holding member 46 is set to be equal to the width of the opening 42 so as to be capable of closing the opening 42. The length of divided mold also serving as holding member 46 is set to be equal to or larger than the length that allows the opening 42 to be closed in the position corresponding to the molding space CA while the mold parts 11 and 21 are closed with a cracking clearance CL therebetween as illustrated in FIG. 9. The material for the divided mold also serving as holding member 46 can be any metallic material. However, brass may be used from the viewpoints of workability, the strength in contact between the anchor material and the fasteners, and thermal conductivity.

The divided mold also serving as holding member 46 has at the tip a second holding surface 45 opposed to the first holding surface 43. The second holding surface 45 has at the central part in the width direction a first groove part 48 into which the side anchor 2b is inserted. The divided mold also serving as holding member 46 has a magnet 49 embedded therein in such a manner as to be exposed from the middle part of the bottom surface of the first groove part 48. The base portion of the side anchor 2b protruding outward from the molding space CA is fitted into the first groove part 48 and held in the first groove part 48 by the magnet 49. The depth of the first groove part 48 is set to be almost equal to the diameter of the side anchor 2b so as to be capable of holding the side anchor 2b without backlash in the mold opening/closing direction.

Figure 10:
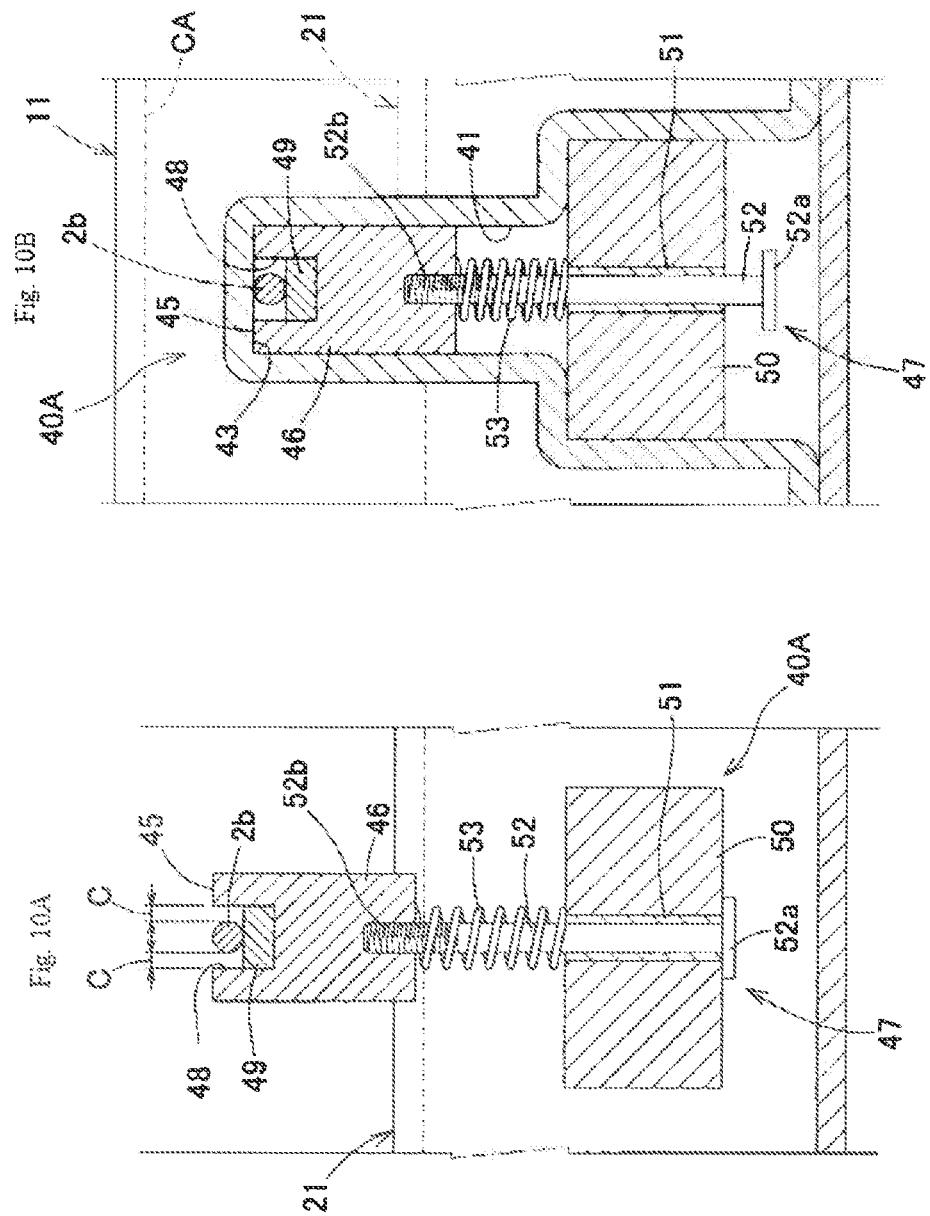
FIG. 10A is a cross-sectional view of FIG. 4B taken along line X-X and FIG. 10B is a cross-sectional view of FIG. 4B taken along line X-X in which the mold is closed.

The divided mold biasing means 47 will be described. As illustrated in FIGS. 4 and 6 to 10, a bracket 50 protruding downward is integrally provided on the lower surface of the convex mold part 21. A sleeve 51 is fitted and fixed to the bracket 50 in the mold opening/closing direction, and a guide rod 52 is inserted into the sleeve 51 movably in the mold opening/closing direction. The guide rod 52 has a screw part 52b at the leading end portion on the concave mold part 11 side. The divided mold also serving as holding member 46 is detachably fixed to the screw part 52b of the guide rod 52. The guide rod 52 has a stopper 52a fixed to the back end portion which is capable of abutting against the bracket 50. A spring member 53 composed of a compression coil spring is fitted as a biasing member onto the guide rod 52 between the divided mold also serving as holding member 46 and the bracket 50. While the mold is opened, the divided mold also serving as holding member 46 protrudes toward the concave mold part 11 by a specific distance as illustrated in FIGS. 8 and 10A. In addition, when the concave mold part 11 and the convex mold part 21 are closed while the molded article fastening member 4 is attached to the convex mold part 21 as illustrated in FIG. 8, the side anchor 2b is sandwiched between the first holding surface 43 and the second holding surface 45 by biasing force of the divided mold biasing means 47 in the state in which the concave mold part 11 and the convex mold part 21 are completely closed as illustrated in FIG. 7 and in the state in which they are closed with the cracking clearance CL therebetween as illustrated in FIG. 9. The materials for the sleeve 51 and the guide rod 52 can be any arbitrary metallic materials. However, brass may be used for the sleeve 51 from the viewpoint of workability, and stainless steel may be used for the guide rod 52 for assuring favorable sliding with the sleeve 51.

The divided mold also serving as holding member 46 is detachably attached to the screw part 52b of the guide rod 52. Alternatively, the stopper 52a may be detachably fixed to the guide rod 52 so that the divided mold also serving as holding member 46 can be removed from the bracket 50 by detaching the stopper 52a. As described above, the divided mold also serving as holding member 46 may be configured to be detachable from the convex mold part 21 because the divided mold also serving as holding member 46 can be replaced easily in the case of wear or breakage. In addition, the sleeve 51 may be provided to reduce sliding resistance of the guide rod 52 but may be omitted. The divided mold biasing means 47 may be configured in a manner different from that described above as far as it can guide the divided mold also serving as holding member 46 movably in the mold opening/closing direction and bias the divided mold also serving as holding member 46 toward the first holding surface 43.

Instead of the first groove part 48, the first holding surface 43 may have a groove part in which the base portion of the side anchor 2b can be fitted or the first holding surface 43 and the second holding surface 45 may each have a groove part so that the groove parts can be combined together to store the base portion of the side anchor 2b. In addition, the width of the opening 42 and the storage concave part 41 may be the same as the width of the groove in the first groove part 48 and the width of the divided mold also serving as holding member 46 may be the same as the width of the opening 42, so that the first groove part 48 can be omitted from the divided mold also serving as holding member 46, for example. In this case, it is necessary to form a clearance through which pre-expanded beads cannot pass between the inner surface of the opening 42 and the base portion of the side anchor 2b while the mold is closed for cracking-filling.

Figure 4A:
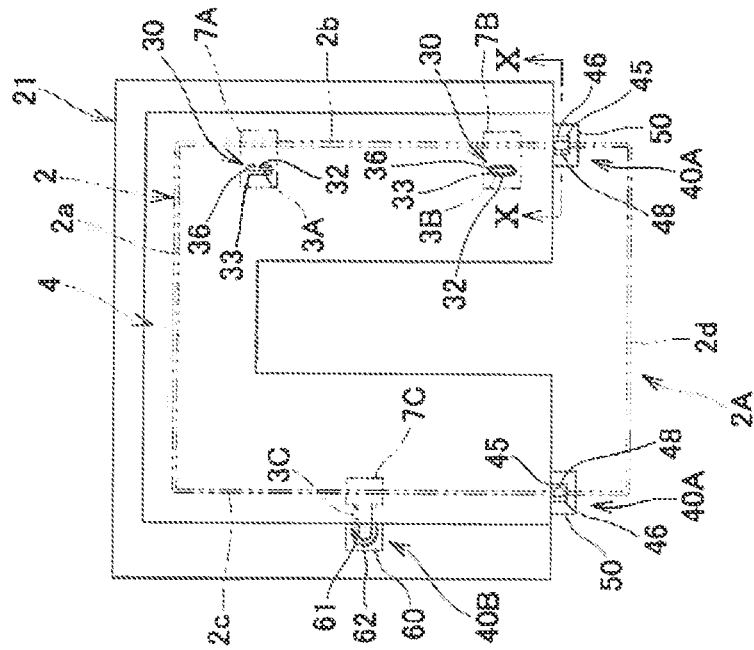
FIG. 4A is a front view of a mating surface of a concave mold part and FIG. 4B is a front view of a mating surface of a convex mold part.
Figure 4B:
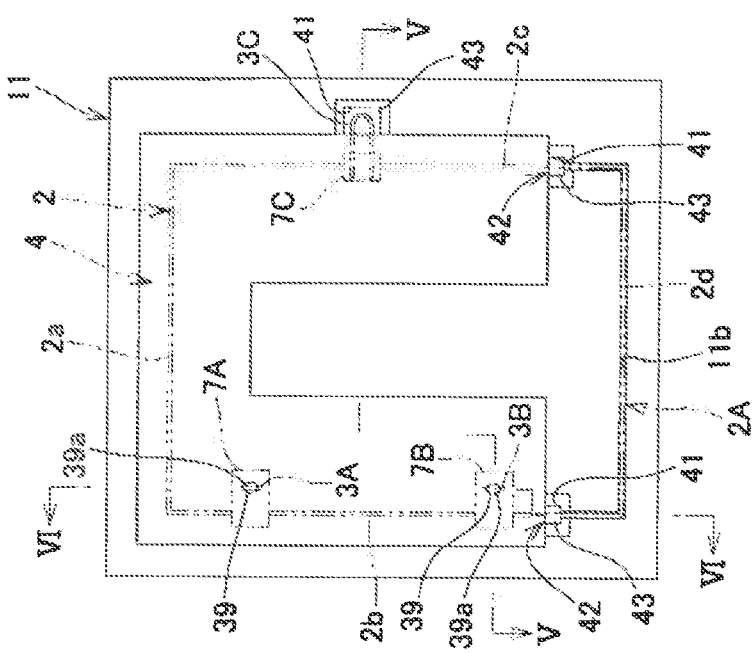
Figure 11:
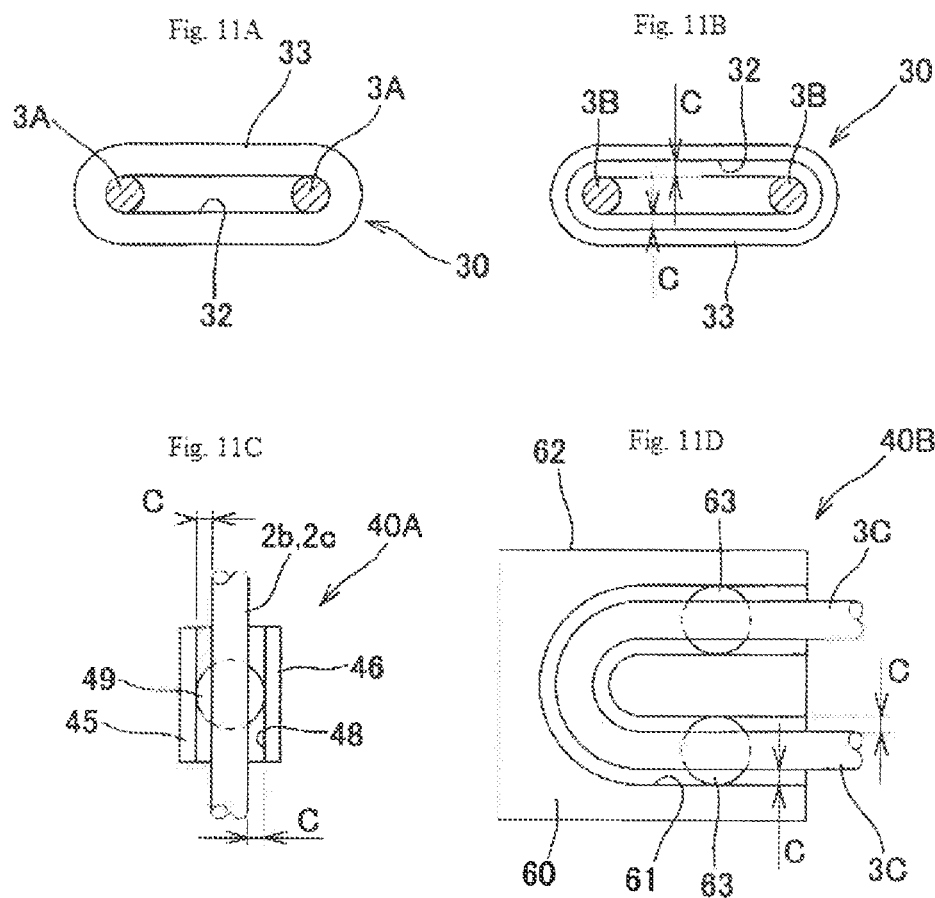
FIG. 11A is a front view of a convex mold part mating surface of a fixing and holding tool for holding a first fastener arranged in a molding space.
FIG. 11B is a front view of a concave mold part mating surface of a fixing and holding tool for holding a second fastener arranged in the molding space.
FIG. 11C is a front view of the convex mold part mating surface of a divided mold also serving as holding member for fixing and holding an anchor material arranged outside the molding space.
FIG. 11D is a front view of the convex mold part mating surface of a divided mold also serving as holding member fixing and holding a third fastener arranged outside the molding space.

The divided mold also serving as holding means 40B for fixing and holding the third fastener 3C is configured in the same manner as the divided mold also serving as holding means 40A except that, instead of the first holding surface 43, a first holding surface 43B is formed in a position opposed to the third fastener 3C in the concave mold part 11, and instead of the divided mold also serving as holding member 46, a rectangular block-shaped divided mold also serving as holding member 62 having a second holding surface 60 opposed to the first holding surface 43B and a U-shaped second groove part 61 to be fitted to the third fastener 3C is provided, and two magnets 63 are embedded in the divided mold also serving as holding member 62 in such a manner as to be exposed into the second groove part 61, as illustrated in FIGS. 4, 5, and 11. Accordingly, the members of the divided mold also serving as holding means 40B same as those of the divided mold also serving as holding means 40A are given the same reference signs as those of the divided mold also serving as holding means 40A and descriptions thereof will be omitted. The divided mold also serving as holding member 62 may be formed from a material different from that for the divided mold also serving as holding member 46 but the divided mold also serving as holding member 62 may be formed from the same material as that for the divided mold also serving as holding member 46. However, instead of the divided mold also serving as holding means 40B, the divided mold also serving as holding means 40A may be provided in correspondence with a pair of base portions of the third fastener 3C to fix and hold the third fastener 3C.

The molded article fastening member 4 may be held by the holding means 30, 40A, and 40B so as not to move in a direction orthogonal to the mold opening/closing direction in the molding space CA. However, the molded article fastening member 4 may be configured to be movable in the direction orthogonal to the mold opening/closing direction by a specific distance. Specifically, the molded article fastening member 4 is positioned and held without a clearance so as to be immovable in the direction orthogonal to the mold opening/closing direction relative to any one of the two fitting concave parts 32, the two first groove parts 48, and the one second groove part 61, and is movable in the direction orthogonal to the mold opening/closing direction relative to the remaining four parts by a specific distance. For example, the first fastener 3A is fitted into the fitting concave part 32 almost without clearance as illustrated in FIG. 11A, the second fastener 3B is fitted into the fitting concave part 32 with a clearance C as illustrated in FIG. 11B, the side anchors 2b and 2c are fitted into the first groove parts 48 with the clearance C as illustrated in FIG. 11C, and the third fastener 3C is fitted into the second groove part 61 with the clearance C as illustrated in FIG. 11D.

According to this configuration, when the molded article fastening member 4 is attached to the convex mold part 21 or the pre-expanded beads are heated, expanded, and fused at the time of in-mold foam-molding, it is possible to prevent deformation of the wire due to dimensional deviation resulting from the fabrication accuracy of the molded article fastening member 4 or linear expansion at the time of heating the molded article fastening member 4. This allows the foam-molded body 5 to be integrally molded in the molded article fastening member 4 in the natural state. Accordingly, after the molding of the molded article 1, it is possible to almost completely eliminate the force of the molded article fastening member 4 returning to the original shape to prevent deformation of the molded article 1 after the molding. The clearance C may be 0.5 to 3.0 mm. When the clearance C is smaller than 0.5 mm, the molded article fastening member 4 may not be fixed to a predetermined place due to variation in the fabrication accuracy of the molded article fastening member 4 to cause deformation of the anchor material 2 or the fasteners 3. When the clearance C is larger than 3.0 mm, the beads will unfavorably leak from the clearance C to generate burrs in the foam-molded body 5.

In the foregoing embodiment, the molded article fastening member 4 is attached to the convex mold part 21 while the concave mold part 11 and the convex mold part 21 are opened. Alternatively, the molded article fastening member 4 may be attached to the concave mold part 11. In this case, the magnets 49 and 63 and the groove parts 48 and 61 are provided on the concave mold part 11. In addition, the convex mold part 21 may have a holding surface, the concave mold part 11 may be provided with the divided mold also serving as holding member, and the magnets 49 and 63 as well as the groove parts 48 and 61 may be provided on the holding surface on the convex mold part 21. Further, when the one anchor material 2 is provided with a plurality of protrusion parts protruding outward from the foam-molded body 5 and the plurality of protrusion parts are individually held by the plurality of sets of holding surfaces and divided mold also serving as holding members, the concave mold part 11 is provided with either the holding surfaces or the divided mold also serving as holding members and the convex mold part 21 is provided with the other of the holding surfaces and the divided mold also serving as holding members. That is, when the concave mold part 11 and the convex mold part 21 each have a mixture of the holding surfaces and the divided mold also serving as holding members, the anchor material 2 becomes uneven in height and is attached obliquely. Therefore, the concave mold part 11 is provided with either the holding surfaces or the divided mold also serving as holding members, and the convex mold part 21 is provided with the other of the holding surfaces and the divided mold also serving as holding members. However, in the case in which a plurality of anchor materials 2 is provided, when the concave mold part 11 is provided with either the holding surfaces or the divided mold also serving as holding members and the convex mold part 21 is provided with the other of the holding surfaces and the divided mold also serving as holding members for each of the anchor materials 2, the concave mold unit 11 and the convex mold unit 21 each can be provided with a mixture of the holding surfaces and the divided mold also serving as holding members. Further, when the protrusion part of the anchor 2 is provided at an angle relative to the mold opening/closing direction different from the direction orthogonal to the mold opening/closing direction, the first holding surface and the second holding surface are obliquely provided relative to the mold opening/closing direction at an the same angle as the angle relative to the mold opening/closing direction of the protrusion part of the anchor material 2 so that the protrusion part can be held without gap between the first holding surface and the second holding surface.

(In-Mold Foam-Molding Method)

To fabricate the molded article 1 by the use of the mold apparatus M, first, while the concave mold part 11 and the convex mold part 21 are opened, the first fastener 3A and the second fastener 3B are fitted into the fitting concave part 32 of the holding member 33, the anchor material 2 is fitted into the first groove part 48 of the divided mold also serving as holding member 46 and is attracted and held by the magnet 49, and the third fastener 3C is fitted into the second groove part 61 of the divided mold also serving as holding member 62 and is attracted and held by the magnet 63 to attach the molded article fastening member 4 to the convex mold part 21 as illustrated in FIGS. 8 and 4(b).

Next, the convex mold part 21 and the concave mold part 11 are closed with the cracking clearance CL for performing the cracking-filling onto the polyolefin-based resin pre-expanded beads (not illustrated) to be filled into the molding space CA as illustrated in FIG. 9. At this time, the respective attachment plates 7A and 7B are sandwiched between the front end portion of the holding member 33 and the holding surfaces 39a of the pair of pressure-receiving projections 39 by the biasing force of the holding member biasing means 34 of the pair of holding means 30, the respective side anchors 2b and 2c are held between the pair of divided mold also serving as holding members 46 and the pair of first holding surfaces 43 by the biasing force of the divided mold biasing means 47 of the pair of divided mold also serving as holding means 40A, and the third fastener 3C is held between the divided mold also serving as holding member 62 and the first holding surface 43B by the divided mold biasing means 47 of the divided mold also serving as holding means 40B. In addition, the portions of the three openings 42 formed in the concave mold part 11 corresponding to the pair of base portions of the anchor protrusion part 2A and the third fastener 3C and communicated with the molding space CA are closed by the pair of divided mold also serving as holding member 46 and the divided mold also serving as holding member 62, thereby to prevent the pre-expanded beads from leaking from the three openings 42 to the outside of the molding space CA.

Accordingly, after the cracking-filling of the pre-expanded beads, the concave mold part 11 and the convex mold part 21 are completely closed to hold the molded article fastening member 4 at the correct position in the molding space CA in the thickness direction as illustrated in FIGS. 5 to 7. At this time, while the molded article fastening member 4 is sandwiched between the concave mold part 11 and the convex mold part 21, the holding member 33 and the divided mold also serving as holding members 46 and 62 move backward against the biasing forces of the biasing means 34 and 47 to completely close the concave mold part 11 and the convex mold part 21.

Then, while the concave mold part 11 and the convex mold part 21 are completely closed, steam is supplied to the concave mold chamber 16 and the convex mold chamber 26 for about three to 60 seconds under a heating steam pressure of about 0.10 to 0.40 MPa(G) to heat, expand, and fuse the pre-expanded beads, thereby forming the foam-molded body 5. At this time, the portions in the three openings 42 communicated with the molding space CA are closed by the divided mold also serving as holding members 46 and 62 as described above to prevent the pre-expanded beads from leaking from the molding space CA through the three openings 42. Accordingly, it is possible to obtain the molded article in which, although the insert material having the protrusion part protruding in the direction orthogonal to the mold opening/closing direction is included, the occurrence of burrs around the protrusion part is reliably prevented. This may eliminate the need for the post-processing for removing burrs.

After the pre-expanded beads are heated, expanded, and fused, cooling water is jetted onto the concave mold part 11 and the convex mold part 21 from the back side to cool the molded article 1, and then the concave mold part 11 and the convex mold part 21 are opened to obtain the molded article 1.

In the divided mold also serving as holding means 40A and 40B in the mold apparatus M in the foregoing embodiment, the first holding surfaces 43 and 43B are formed on the concave mold part 11, and the divided mold also serving as holding members 46 and 62 and the divided mold biasing means 47 are provided on the convex mold part 21. Alternatively, the divided mold also serving as holding members 46 and 62 and the divided mold biasing means 47 may be provided on the concave mold part 11 and the first holding surfaces 43 and 43B may be formed on the convex mold part 21.

For example, instead of the divided mold also serving as holding means 40A holding the side anchor 2b, a divided mold also serving as holding means 70 may be provided in a configuration described below. The same members of the divided mold also serving as holding means 70 as those of the divided mold also serving as holding means 40A will be given the same reference signs as those of the divided mold also serving as holding means 40A, and descriptions thereof will be omitted.

Figure 12:
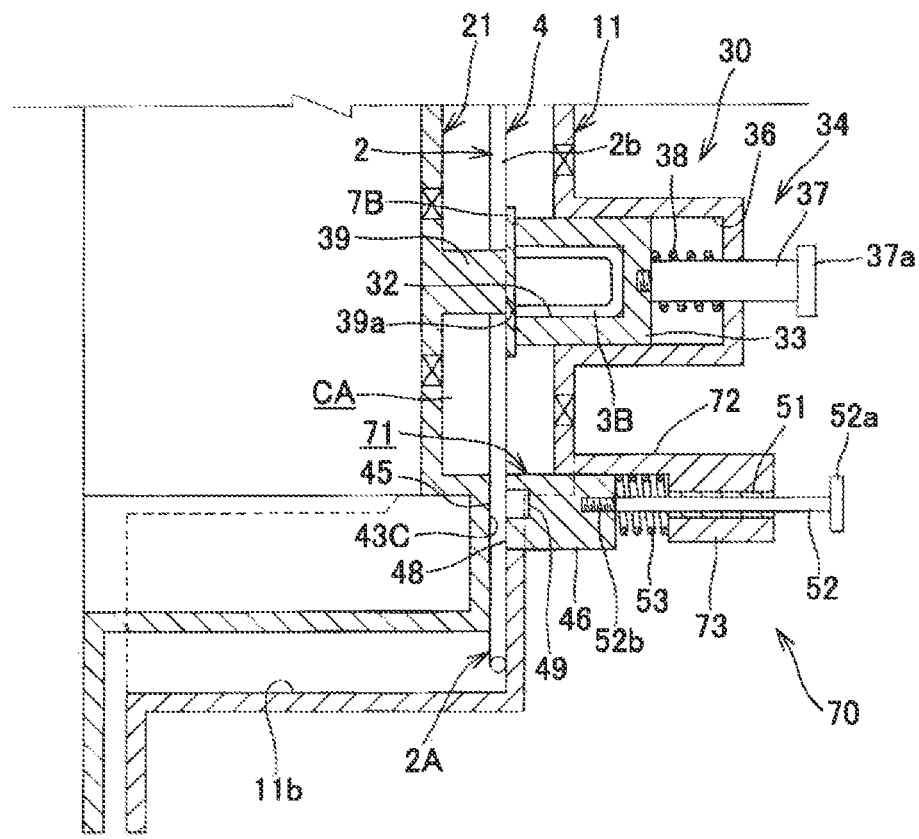
FIG. 12 is a vertical cross-sectional view of main components of a mold in another configuration with a divided mold also serving as holding member on the concave mold part side.

As illustrated in FIG. 12, the divided mold also serving as holding means 70 includes: a divided mold also serving as holding member 46 that has a first holding surface 43C in the convex mold part 21 so as to be opposed to the base portion of the side anchor 2b protruding laterally from the molding space CA, and has a second holding surface 45 in the concave mold part 11 so as to be opposed to the first holding surface 43C; and a divided mold biasing means 47 that guides the divided mold also serving as holding member 46 movably in the mold opening/closing direction and constantly biases the divided mold also serving as holding member 46 toward the first holding surface 43C, such that an opening 71 formed in the concave mold part 11 opposed to the first holding surface 43C is closed by the divided mold also serving as holding member 46.

To support the divided mold biasing means 47 in the concave mold part 11, a support arm 72 extending outward in the mold opening/closing direction is integrally provided at the rim of the opening 71 of the concave mold part 11. A bracket 73 is integrally provided in the support arm 72. A guide rod 52 of the divided mold biasing means 47 is attached to the sleeve 51 provided in the bracket 73 in such a manner as to be movable in the mold opening/closing direction. The divided mold also serving as holding member 46 is constantly biased by a spring member 53 toward the first holding surface 43C.

In the divided mold also serving as holding means 70, the side anchor 2b is held between the divided mold also serving as holding member 46 and the first holding surface 43C and the opening 71 is closed by the divided mold also serving as holding member 46 in the state in which the concave mold part 11 and the convex mold part 21 are completely closed and in the state in which the cracking clearance is left. Accordingly, the opening 71 is closed at the time of the cracking-filling of the pre-expanded beads, thereby making it possible to prevent leakage of the pre-expanded beads to the outside of the molding space CA. In this case, the pressure-receiving projection 39 of the holding means 30 may be provided on the convex mold part 21, and the holding member 33 and the holding member biasing means 34 are provided on the concave mold part 11.

As far as the mold according to one or more embodiments of the present invention is a molded article configured such that part of the insert material protrudes laterally from the foam-molded body in the mold opening/closing direction, the mold is used which is provided with the divided mold also serving as holding means being configured as described above and holding the base portion of the insert material protruding outward from the foam-molded body, thereby to mold vehicle seat core materials configured in a manner different from the foregoing configuration of the molded article 1, and to mold molded articles having any configurations such as automobile interior members including vehicle bumper core materials and head rest core materials other than vehicle seat core materials, and various molded articles for arbitrary purposes other than vehicle components.

(Evaluation Test)

Next, an example according to one or more embodiments of the present invention will be described more in details. However, the present invention is not limited to the following example.

In the example, the following beads were used:
Polypropylene-based resin pre-expanded beads: Eperan-PP 36 times (produced by Kaneka Corporation)

The beads were obtained by foaming an ethylene-propylene random copolymer resin at an expansion ratio of 36.

EXAMPLE

[Molded Article Fastening Member]

The molded article fastening member 4 having the anchor material 2 composed of a square iron wire with a diameter of 5 mm, a length of 450 mm, and a width of 400 mm was used as illustrated in FIGS. 1 and 2.

[Production of the Polyolefin-Based Resin Foam-Molded Body]

As a mold, a flat-plate U-shaped (with a length of 325 mm and a width of 125 mm) mold with a length of 450 mm, a width of 450 mm, and a thickness of 50 mm having the divided mold also serving as holding means 40A and 40B as illustrated in FIG. 4 was mounted on a P 300 molding machine (manufactured by Toyo Machinery & Metal Co., Ltd.).

Then, the molded article fastening member 4 was fixed to the convex mold part 21, and the pre-expanded beads under an inner pressure of about 0.1 MPa(G) by impregnating with pressured air in a pressure-tight container underwent cracking-filling to be filled into the molding space CA. After that, the mold was completely closed, and the steam pressure was increased up to 0.33 MPa(G) in 23 seconds, and the pre-expanded beads were heated for two seconds in that state, and were fused. Then, the pre-expanded beads were water-cooled for 110 seconds and were removed from the mold to obtain the molded article 1 illustrated in FIGS. 1 to 3.

No burrs were generated in the base portion of the anchor protrusion part 2A, and the base portion of the fastener 3C exposed from the foam-molded body 5. As for the fasteners 3A and 3B, no burrs were generated outside the U-shaped portions of the fasteners 3A and 3B but slight burrs were observed inside the U-shaped portions.

Accordingly, it is obvious to obtain the effect of preventing the occurrence of burrs by using the divided mold also serving as holding means 40A and 40B to hold the base portion of the anchor protrusion part 2A protruding laterally relative to (the direction orthogonal to) the mold opening/closing direction and the fastener 3C.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

REFERENCE SIGNS LIST

1 Molded article
2 Anchor material
2A Anchor protrusion part
2a Upper anchor
2b Side anchor
2c Side anchor
2d Lower anchor
3A First fastener 3B Second fastener
3C Third fastener
4 Molded article fastening member
5 Foam-molded body
6 Molded body
7A Attachment plate
7B Attachment plate
7C Attachment plate
M Mold apparatus
10 Concave mold unit
11 Concave mold part
11a Vent hole
11b Groove part
12 Concave mold housing
13 Concave mold frame
14 Center plate
15 Concave mold back plate
16 Concave mold chamber
17 Filling gun
18a Steam supply pipe
18b Cooling water supply pipe
18c Drain pipe
18d Nozzle
20 Convex mold unit
21 Convex mold part
21a Vent hole
22 Convex mold housing
23 Convex mold frame
24 Center plate
25 Convex mold back plate
26 Convex mold chamber
28a Steam supply pipe
28b Cooling water supply pipe
28c Drain pipe
28d Nozzle
30 Holding means
32 Fitting concave part
33 Holding member
34 Holding member biasing means (or "biasing part")
36 Storage concave part
37 Guide rod
37a Stopper
38 Spring member
39 Pressure-receiving projection
39a Holding surface
40A Divided mold also serving as holding means (or "divided mold")
41 Storage concave part
42 Opening
43 First holding surface
45 Second holding surface
46 Divided mold also serving as holding member (or "divided mold member")
47 Divided mold biasing means (or "biasing part")
48 First groove part
49 Magnet
50 Bracket
51 Sleeve
52 Guide rod
52a Stopper
52b Screw part
53 Spring member
40B Divided mold also serving as holding means (or "divided mold")
43B First holding surface
60 Second holding surface
61 Second groove part
62 Divided mold also serving as holding member (or "divided mold member")
63 Magnet
70 Divided mold also serving as holding means (or "divided mold")
71 Opening
72 Support arm
73 Bracket
43C First holding surface
C Gap
CA Molding space
CL Cracking clearance

The invention claimed is:

1. A mold for in-mold foam-molding of a polyolefin-based resin for producing a molded article comprising:
a first mold part,
a second mold part, and
a divided mold that holds an insert material, wherein
the insert material has a protrusion part protruding laterally from a foam-molded body relative to an opening/closing direction of the mold,
the divided mold is formed on the first and the second mold parts in correspondence with the protrusion part of the insert material,
the first mold part has a first holding surface opposed to a base portion of the protrusion part protruding to the outside of a molding space,
the second mold part has a divided mold member having a second holding surface opposed to the first holding surface and a biasing part that guides the divided mold member movably in the mold opening/closing direction and constantly biases the divided mold member toward the first holding surface,
at least one of the first holding surface and the second holding surface has a groove part in which the base portion of the protrusion part is fitted with a clearance, and
the base portion of the protrusion part of the insert material is configured for being held between the first and second holding surfaces by the divided mold in the state in which the first and second mold parts are completely closed and the state in which a cracking clearance left between the first and second mold parts.

2. The mold for in-mold foam-molding of a polyolefin-based resin according to claim 1, wherein at least one of the first holding surface and the second holding surface has a magnet configured for attracting and holding the base portion of the protrusion part to allow the insert material to be fixed and held in the first mold part or the second mold part.

3. The mold for in-mold foam-molding of a polyolefin-based resin according to claim 1, wherein at least one of the first holding surface and the second holding surface has a magnet configured for attracting and holding the base portion of the protrusion part to allow the insert material to be fixed and held in the first mold part or the second mold part.

4. The mold for in-mold foam-molding of a polyolefin-based resin according to claim 1, wherein
the biasing part comprises:
a bracket integrally molded in the second mold part;
a guide rod in the bracket that is movable in the mold opening/closing direction; and
a biasing member that constantly biases the guide rod toward the first holding surface, and
the divided mold member is attached to a tip of the guide rod.

5. The mold for in-mold foam-molding of a polyolefin-based resin according to claim 4, wherein the bracket comprises a sleeve configured for guiding the guide rod in the mold opening/closing direction.

6. The mold for in-mold foam-molding of a polyolefin-based resin according to claim 1, wherein the divided mold member is detachable from the biasing part.

7. The mold for in-mold foam-molding of a polyolefin-based resin according to claim 1, wherein the insert material comprises a molded article fastening member having an anchor material and a plurality of fasteners added to the anchor material, and the protrusion part is formed at least on part of the anchor material or the fasteners.

8. The mold for in-mold foam-molding of a polyolefin-based resin according to claim 1, wherein the molded article is produced in a manner that, while the insert material is arranged in the molding space, pre-expanded beads made of a polyolefin-based foamed resin undergo cracking-filling to be filled into the molding space and then the insert material is embedded and integrally molded in the foam-molded body by in-mold foam-molding.

9. The mold for in-mold foam-molding of a polyolefin-based resin according to claim 1, wherein the molded article is a vehicle seat core material.

10. The mold for in-mold foam-molding of a polyolefin-based resin according to claim 1, wherein the clearance is 3.0 mm or less between the groove part and the base portion of the protrusion part.

11. A mold for in-mold foam-molding of a polyolefin-based resin for producing a molded article comprising:
a first mold part,
a second mold part, and
a divided mold that holds an insert material, wherein
the insert material has a protrusion part protruding laterally from a foam-molded body relative to an opening/closing direction of the mold,
the divided mold is formed on the first and the second mold parts in correspondence with the protrusion part of the insert material,
the first mold part has a first holding surface opposed to a base portion of the protrusion part protruding to the outside of a molding space,
the second mold part has a divided mold member having a second holding surface opposed to the first holding surface and a biasing part that guides the divided mold member movably in the mold opening/closing direction and constantly biases the divided mold member toward the first holding surface,
the biasing part comprises:
  a bracket integrally molded in the second mold part;
  a guide rod in the bracket that is movable in the mold opening/closing direction; and
  a biasing member that constantly biases the guide rod toward the first holding surface,
the divided mold member is attached to a tip of the guide rod, and
the base portion of the protrusion part of the insert material is configured for being held between the first and second holding surfaces by the divided mold in the state in which the first and second mold parts are completely closed and the state in which a cracking clearance left between the first and second mold parts.

12. The mold for in-mold foam-molding of a polyolefin-based resin according to claim 11, wherein the bracket comprises a sleeve configured for guiding the guide rod in the mold opening/closing direction.

13. A mold for in-mold foam-molding of a polyolefin-based resin for producing a molded article comprising:
a first mold part,
a second mold part, and
a divided mold that holds an insert material, wherein
the insert material has a protrusion part protruding laterally from a foam-molded body relative to an opening/closing direction of the mold,
the divided mold is formed on the first and the second mold parts in correspondence with the protrusion part of the insert material,
the first mold part has a first holding surface opposed to a base portion of the protrusion part protruding to the outside of a molding space,
the second mold part has a divided mold member having a second holding surface opposed to the first holding surface and a biasing part that guides the divided mold member movably in the mold opening/closing direction and constantly biases the divided mold member toward the first holding surface,
the divided mold member is detachable from the biasing part, and
the base portion of the protrusion part of the insert material is configured for being held between the first and second holding surfaces by the divided mold in the state in which the first and second mold parts are completely closed and the state in which a cracking clearance left between the first and second mold parts.

14. A method for manufacturing an in-mold foam-molded article, the method comprising:
performing cracking-filing to fill pre-expanded beads made of a polyolefin-based foamed resin into the molding space of the mold according to claim 1 while the insert material is arranged in the molding space,
heating and fusing the pre-expanded beads in the molding space, and
integrally molding the insert material that is embedded in the foam-molded body,
wherein the cracking-filling is performed without forming a clearance allowing the pre-expanded beads to pass at the position corresponding to the base portion of the protrusion part, and
wherein the heating and the fusing is performed while the base portion of the protrusion part is held between the first holding surface and the second holding surface, and the first mold part and the second mold part are completely closed.

15. The method for manufacturing an in-mold foam-molded article according to claim 14, wherein a groove part in which the base portion of the protrusion part configured for being fitted is formed on at least one of the first holding surface and the second holding surface.

16. The method for manufacturing an in-mold foam-molded article according to claim 14, wherein the molded article is a vehicle seat core material.

* * * * *